(12) United States Patent
Tsai et al.

(10) Patent No.: US 10,879,982 B1
(45) Date of Patent: Dec. 29, 2020

(54) BEAMFORMING TRANSMISSION DEVICE AND METHOD

(71) Applicant: Industrial Technology Research Institute, Hsinchu (TW)

(72) Inventors: Shang-Ho Tsai, Hsinchu (TW); Kuo-Chen Ho, Hsinchu County (TW); Yi-Chen Chen, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/711,362

(22) Filed: Dec. 11, 2019

(51) Int. Cl.
*H04B 7/02* (2018.01)
*H04B 7/06* (2006.01)
*H01Q 3/36* (2006.01)
*H04W 16/28* (2009.01)

(52) U.S. Cl.
CPC ............. *H04B 7/0617* (2013.01); *H01Q 3/36* (2013.01); *H04B 7/0626* (2013.01); *H04W 16/28* (2013.01)

(58) Field of Classification Search
CPC ... H04B 7/0617; H04B 7/0626; H04W 16/28; H01Q 3/36
USPC ....................................................... 375/267
See application file for complete search history.

(56) References Cited

U.S. PATENT DOCUMENTS

| 9,231,676 | B2 * | 1/2016 | Zirwas | H04B 7/0691 |
| 10,009,073 | B2 | 6/2018 | Tsai et al. | |
| 2006/0274862 | A1 | 12/2006 | Lui et al. | |
| 2012/0063500 | A1 * | 3/2012 | Wang | H04B 7/0639 375/224 |
| 2013/0244656 | A1 | 9/2013 | Heo et al. | |
| 2015/0200718 | A1 * | 7/2015 | Sajadieh | H04B 1/56 375/267 |
| 2015/0282001 | A1 * | 10/2015 | Kwak | H04B 7/0617 370/229 |
| 2017/0104517 | A1 * | 4/2017 | Kakishima | H04B 7/0697 |
| 2018/0212653 | A1 * | 7/2018 | Miao | H04B 7/0452 |

(Continued)

FOREIGN PATENT DOCUMENTS

WO WO 2012154090 A1 11/2012
WO WO 2016185384 A1 11/2016

OTHER PUBLICATIONS

Liu, Fan et al. "An Efficient Manifold Algorithm for Constructive Interference based Constant Envelope Precoding", IEEE Signal, Processing Letters, Oct. 2017, pp. 1542-1546, vol. 24, No. 10, IEEE, US.

(Continued)

*Primary Examiner* — Don N Vo

(57) ABSTRACT

A beamforming transmission device includes a control unit, at least one radio frequency unit, and at least one signal transmission unit. The control unit is configured to receive a radio frequency signal and channel state information of at least two pieces of user equipment, and to generate a control signal according to the radio frequency signal and the channel state information of the at least two pieces of user equipment. The radio frequency unit is coupled to the control unit. The radio frequency unit is configured to receive the control signal and generate a beamforming signal according to the control signal. The signal transmission unit is coupled to the radio frequency unit. The signal transmission unit is configured to transmit the beamforming signal to the at least two pieces of user equipment.

11 Claims, 6 Drawing Sheets

(56) References Cited

U.S. PATENT DOCUMENTS

2018/0343536 A1 11/2018 Alrabadi
2019/0253123 A1* 8/2019 Su .................. H04B 7/0413

OTHER PUBLICATIONS

3GPP TSG-RAN WG1 Meeting #96. "Clustering and Cluster Head Election Schemes for In-Coverage and Out-of-Coverage Ues", Ericsson, Mar. 2019, 6 pages, US.

Mohammed et al., "Constant envelope precoding for power-efficient downlink wireless communication in multi-user MIMO systems using large antenna arrays" 2012 IEEE International Conference on Acoustics, Speech and Signal Processing (ICASSP), Aug. 2012, pp. 2949-2952, IEEE, US.

Chaitanya et al., "Constant envelope signal space diversity", 2014 IEEE International Conference on Acoustics, Speech and Signal Processing (ICASSP), Jul. 2014, pp. 3147-3151, IEEE, US.

Mohammed et al., "Constant-Envelope Multi-User Precoding for Frequency-Selective Massive MIMO Systems", IEEE Wireless Communications Letters, Oct. 2013, pp. 547-550, vol. 2, No. 5, IEEE, US.

3GPP TS 36.213 . "Evolved Universal Terrestrial Radio Access (E-UTRA); Physical layer procedures", European Telecommunications Standards Institute, V. 15.2.0, Oct. 2018.

Chen et al., "Improved Constant Envelope Multiuser Precoding for Massive MIMO Systems", IEEE Communications Letters, Aug. 2014, pp. 1311-1314, vol. 18, No. 8, IEEE, US.

Mollén et al., "Multiuser MIMO precoding with perantenna continuous-time constantenvelope constraints" 2015 IEEE 16th International Workshop on Signal Processing Advances in Wireless Communications (SPAWC), Aug. 2015, pp. 261-265, IEEE, US.

Mohammed et al., "Per-Antenna Constant Envelope Precoding for Large Multi-User MIMO Systems", IEEE Transactions on Communications, Mar. 2013, pp. 1059-1071, vol. 61, No. 3, IEEE, US.

Mohammed et al., "Power-efficient downlink communication using large antenna arrays: The doughnut channel", 2012 IEEE International Conference on Communications (ICC), Nov. 2012, pp. 2145-2150, IEEE, US.

Pan et al., "Signal region characterization and exact phase recovery for constant envelope precoding in single-user large-scale MISO channels", 2013 IEEE International Conference on Acoustics, Speech and Signal Processing, Oct. 2013, pp. 5065-5069, IEEE, US.

* cited by examiner

BEAMFORMING TRANSMISSION DEVICE AND METHOD

TECHNICAL FIELD

The present disclosure relates to a beamforming transmission device and method.

BACKGROUND

Current designs of traditional antenna arrays employ a plurality of radio frequency (RF) chains to support a plurality of pieces of user equipment. The beam of an antenna array with the traditional design has only a single beamforming direction and is concentrated in a single direction, so that the beam can only support one piece of user equipment at a time. That is, using a traditional design for an antenna array, the number of RF chains must be equal to or greater than the number of the plurality of pieces of user equipment. Therefore, the traditional antenna array design may increase the design complexity and power consumption.

Accordingly, how to effectively reduce the design complexity and power consumption of an antenna array design has become an important issue.

SUMMARY

The present disclosure provides a beamforming transmission device, which includes a control unit, and at least one radio frequency unit and at least one signal transmission unit. The control unit is configured to receive a radio frequency signal and channel state information of at least two pieces of user equipment (UEs), and generate a control signal according to the radio frequency signal and the channel state information of the at least two pieces of user equipment. The radio frequency unit is coupled to the control unit. The radio frequency unit is configured to receive the control signal and generate a beamforming signal according to the control signal. The signal transmission unit is coupled to the radio frequency unit. The signal transmission unit is configured to transmit the beamforming signal to the at least two pieces of user equipment.

The present disclosure provides a beamforming transmission method, which includes the following steps. A radio frequency signal and channel state information of at least two pieces of user equipment (UEs) are received. A control signal is generated according to the radio frequency signal and the channel state information of the at least two pieces of user equipment. The control signal is received, and a beamforming signal is generated according to the control signal through at least one radio frequency unit. The beamforming signal is transmitted to the at least two pieces of user equipment.

BRIEF DESCRIPTION OF DRAWINGS

The present disclosure can be more fully understood by reading the subsequent detailed description and examples with references made to the accompanying drawings, wherein.

DETAILED DESCRIPTION OF DISCLOSED EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or similar element or component.

Figure 1:
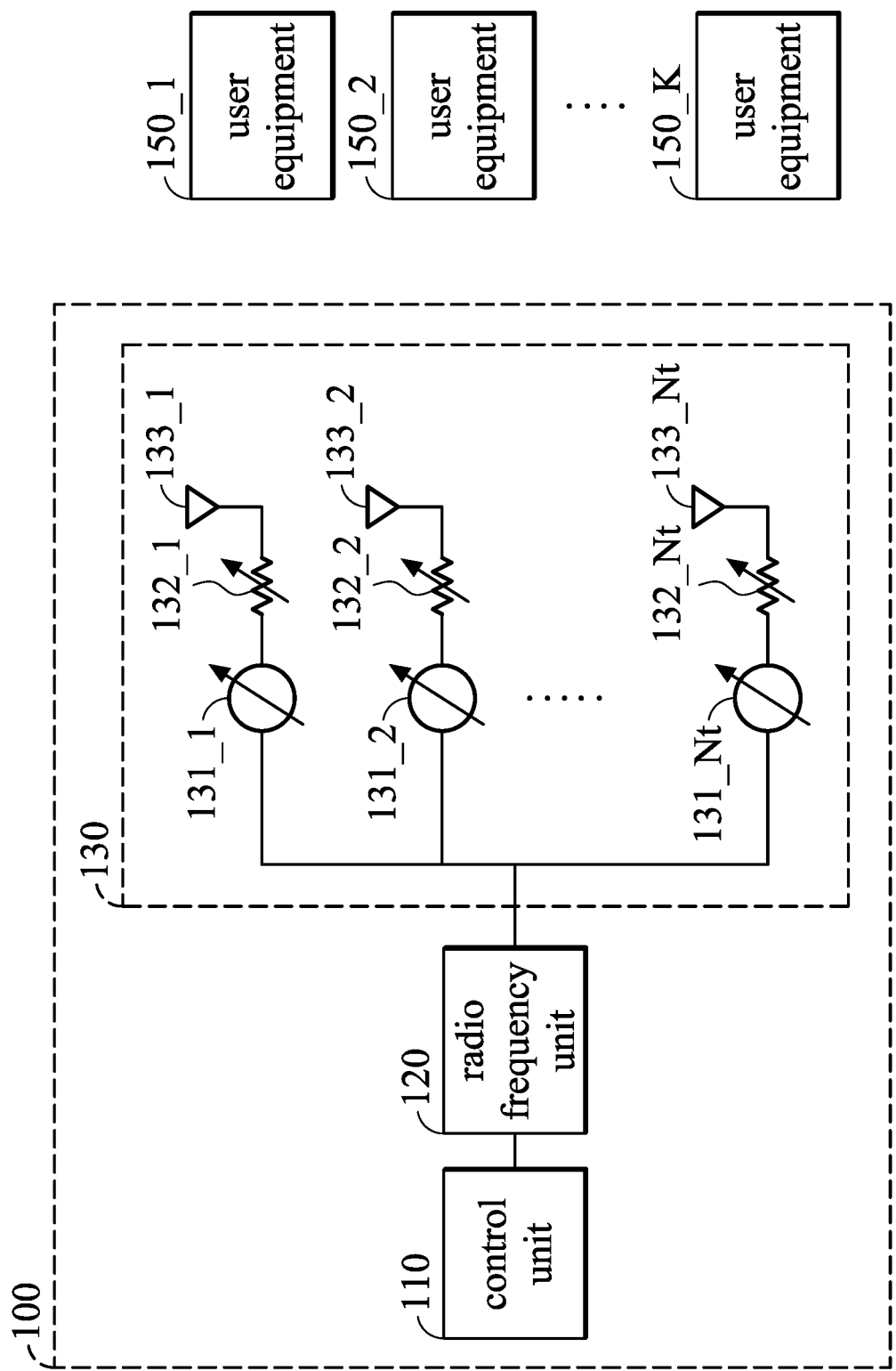
FIG. 1 is a schematic view of a beamforming transmission device according to an embodiment of the present disclosure.

FIG. 1 is a schematic view of a beamforming transmission device according to an embodiment of the present disclosure. In the embodiment, the beamforming transmission unit 100 is configured to provide a beamforming signal to k pieces of user equipment (UEs) 150_1~150_K, wherein k is a positive integer greater than 1 (i.e., K≥2). For example, the beamforming transmission unit 100 provides the beamforming signal to the pieces of user equipment 150_1~150_K through a time division multiple access (TDMA).

The beamforming transmission unit 100 and the pieces of user equipment 150_1~150_K form a cluster, and the beamforming transmission unit 100 is a cluster header in the cluster. In addition, the beamforming transmission unit 100 may be a relay device or a communication device, for example, disposed on a mobile phone, a vehicle, a boat, a train, etc. The pieces of user equipment 150_1~150_K may be communication devices, for example, disposed on a mobile phone, a vehicle, a boat, a train, etc. The pieces of user equipment 150_1~150_K are disposed in different positions.

Please refer to FIG. 1. The beamforming transmission device 100 includes a control unit 110, a radio frequency unit 120 and a signal transmission unit 130.

The control unit 110 is configured to receive a radio frequency signal and channel state information of the pieces of user equipment 150_1~150_K. In the embodiment, the radio frequency signal is generated by a remote device, such as a low-orbit satellite, a base station, etc. Then, the control unit 110 may generate a control signal according to the radio frequency signal and the channel state information of the pieces of user equipment 150_1~150_K.

The radio frequency unit 120 is coupled to the control unit 110. The radio frequency unit 120 is configured to receive the control signal and generate a beamforming signal according to the control signal. In the embodiment, the radio frequency unit 120 is, for example, a radio frequency (RF) chain.

The signal transmission unit 130 is coupled to the radio frequency unit 120. The signal transmission unit 130 is configured to transmit the beamforming signal to the pieces of user equipment 150_1~150_K.

In the embodiment, the signal transmission unit 130 includes a plurality of phase shifters 131_1~131_Nt, a plurality of gain units 132_1~132_Nt and a plurality of antenna units 133_1~133_Nt, wherein Nt is a positive integer greater than 1.

The phase shifters 131_1~131_Nt are coupled to the radio frequency unit 120. The phase shifters 131_1~131_Nt are configured to adjust the phase of the beamforming signal.

The gain units 132_1~132_Nt are coupled to the corresponding phase shifters 131_1~131_Nt, respectively. For example, the gain unit 132_1 is coupled to the corresponding phase shifter 131_1, the gain unit 132_2 is coupled to the phase shifter 131_2, ..., the gain unit 132_Nt is coupled to the phase shifter 131_Nt. The gain units 132_1~132_Nt are configured to adjust the gain of the beamforming signal.

The antenna units 133_1~133_Nt are coupled to the corresponding gain units 132_1~132_Nt, respectively. For example, The antenna unit 133_1 is coupled to the corresponding gain unit 132_1, the antenna unit 133_2 is coupled to the corresponding gain unit 132_2, ..., the antenna unit 133_Nt is coupled to the corresponding gain unit 132_Nt. The antenna units 133_1~133_Nt are configured to transmit the beamforming signal to the pieces of user equipment 150_1~150_K.

When the control unit 110 obtains the channel state information of the pieces of user equipment 150_1~150_K, the control unit 110 may calculate, for example, gains corresponding to the pieces of user equipment 150_1~150_K according to a cost function of the channel state information of the pieces of user equipment 150_1~150_K. In the embodiment, the channel state information of the pieces of user equipment 150_1~150_K may include the following equations: equation (1) and equation (2).

$$h_k^T = \sqrt{\frac{N_t}{L}} \sum_{l=1}^{L} \alpha_l a_t(\theta_l)^H, \tag{1}$$

$$H = [h_1^T h_2^T \ldots h_K^T]^T, \tag{2}$$

wherein $h_k^T$ (k=1~K) indicates mmWave channel information of the channel state information of kth of pieces of user equipment 150_1~150_K, H indicates a matrix of the channel information, L indicates a number of paths corresponding to the pieces of user equipment, $\alpha_l$ indicates a complex gain of lth path, $\theta_l$ is an angle of arrival (AOA) of lth path, $N_t$ indicates a number of antenna units 133_1~133_Nt, $a_t(\theta_l)$ indicates a steering vector with beam angle $\theta_l$, a superscript "H" in equation (1) indicates a Hermitian operation of a matrix.

In addition, $a_t(\theta_l)$ may be expressed by equation (3).

$$a_t(\theta_l) = \frac{1}{\sqrt{N_t}} \left[1, e^{j\frac{2\pi}{\lambda} d \sin(\theta_l)}, \ldots, e^{j(N_t-1)\frac{2\pi}{\lambda} d \sin(\theta_l)}\right]^T, \tag{3}$$

wherein $\lambda$ indicates a wavelength of mmWave frequency, d indicates an inter-element spacing.

In one embodiment, the cost function may include a maximization of the minimum of data rates of the pieces of user equipment 150_1~150_K. The maximization of the minimum of data rates of the pieces of user equipment 150_1~150_K may be expressed as the following equations: equation (4), equation (5) and equation (6).

$$\max \min(R_1, R_2, \ldots, R_K), \tag{4}$$

$$R_k = \log_2\left(1 + \frac{g_k^2}{\sigma^2}\right), \tag{5}$$

$$g_1^2 \|q_1\|^2 + g_2^2 \|q_2\|^2 + \ldots + g_K^2 \|q_K\|^2 = P_T, \tag{6}$$

wherein, $R_1, R_2, \ldots, R_K$ respectively indicate the data rates of k pieces of user equipment 150_1~150_K, $g_k$ (k=1~K) indicates gains corresponding to the k pieces of user equipment 150_1~150_K, $\sigma$ indicates a standard deviation of a noise, $q_1 \sim q_K = H^H(HH^H)^{-1}$, and $P^T$ indicates a total transmit power of the radio frequency signal. Then, the gains corresponding to the pieces of user equipment 150_1~150_K may be easily derived according to the equation (5) and (6).

In another embodiment, the cost function may include a maximization of a sum rate of the pieces of user equipment 150_1~150_K, wherein the sum rate is the total rate of individual piece of user equipments 150_1~150_K. The maximization of the sum rate of the pieces of user equipment 150_1~150_K may be expressed as the following equations: equation (7) and equation (8).

$$\max \sum_{k=1}^{K} \log_2\left(1 + \frac{g_k^2}{\sigma^2}\right), \tag{7}$$

$$g_1^2 \|q_1\|^2 + g_2^2 \|q_2\|^2 + \ldots + g_K^2 \|q_K\|^2 = P_T, \tag{8}$$

wherein, k indicates the pieces of user equipment 150_1~150_K, $g_k$ (k=1~K) indicates gains corresponding to the k pieces of user equipment 150_1~150_K, $\sigma$ indicates the standard deviation of the noise, $q_1 \sim q_K = H^H(HH^H)^{-1}$, and $P_T$ indicates the total transmit power of the radio frequency signal.

Then, a Lagrange multiplier is applied, so that the equation (7) and equation (8) may be derived using equation (9).

$$L(g_1, g_2, \ldots, g_K, \lambda) = \tag{9}$$

$$\sum_{k=1}^{K} \log_2\left(1 + \frac{g_k^2}{\sigma^2}\right) + \lambda(g_1^2 \|q_l\|^2 + \ldots + g_k^2 \|q_K\|^2 + \text{cross terms} - P_T),$$

wherein $L(g_1, g_2, \ldots, g_K, \lambda)$ indicates the Lagrange multiplier, $\lambda$ indicates a template variable that appears when solving the optimization problem using the Lagrange multiplier.

Assuming that the "cross terms" are approximately equal to 0, the following equations, equation (10) and equation (11), are obtained.

$$\frac{\partial L}{\partial g_k} = \frac{1}{\ln(2)\left(1 + \frac{g_k^2}{\sigma^2}\right)} \frac{2g_k}{\sigma^2} + \lambda(2g_k \|q_K\|^2) = 0, \tag{10}$$

$$\lambda = \frac{-1}{\ln(2)(\sigma^2 + g_k^2)\|q_K\|^2}. \tag{11}$$

Then, assuming that $\lambda=\lambda$, the following equations, equation (12) and equation (13), are obtained.

$$(\sigma^2 + g_k^2)\|q_k\|^2 = (\sigma^2 + g_l^2)\|q_l\|^2, \tag{12}$$

$$g_k^2 = g_l^2 \frac{\|q_l\|^2}{\|q_k\|^2} + \sigma^2 \left( \frac{\|q_l\|^2 - \|q_k\|^2}{\|q_k\|^2} \right), \tag{13}$$

wherein $g_l$ indicates an equivalent received gain due to beamforming, $q_l$ indicates 1-th column of the matrix $H^H(HH^H)^{-1}$.

The following equation (14) is obtained to according to equation (13).

$$K g_l^2 \|q_l\|^2 + \sigma^2 \sum_{k=1}^{K} (\|q_l\|^2 - \|q_k\|^2) = P_T. \tag{14}$$

Then, the gains corresponding to the pieces of user equipment 150_1~150_K may be easily derived according to the equation (14).

After the control unit 110 obtains the gains corresponding to the pieces of user equipment 150_1~150_K, the control unit 110 may calculate a precoding vector according to the gains corresponding to the pieces of user equipment 150_1~150_K and the channel state information of the pieces of user equipment 150_1~150_K. In the embodiment, the precoding vector is expressed by equation (15).

$$f = H^H(HH^H)^{-1} \begin{bmatrix} g_1 \\ g_2 \\ \vdots \\ g_K \end{bmatrix}, \tag{15}$$

wherein f indicates a precoding vector and $f \in \mathbb{C}^{N_t \times 1}$, H indicates the mmWave channel information of the channel state information of k pieces of user equipment 150_1~150_K, $g_1 \sim g_K$ indicate gains corresponding to the k pieces of user equipment 150_1~150_K.

After the control unit 110 obtains the precoding vector f, the control unit 110 may generate a control signal according to the precoding vector. In the embodiment, the control signal may expressed by equation (16).

$$r_k = h_k^T f s + n_k, \tag{16}$$

wherein $r_k$ indicates the control signal, s indicates a symbol and $s \in \mathbb{C}^{1 \times 1}$, $n_k$ indicates a received noise. Accordingly, the beamforming transmission device 100 may use one radio frequency unit 120 to generate the beamforming signal for the pieces of user equipment. Therefore, the switching speed, the design complexity and the power consumption of the beamforming transmission device 100 may be effectively reduced.

Figure 2:
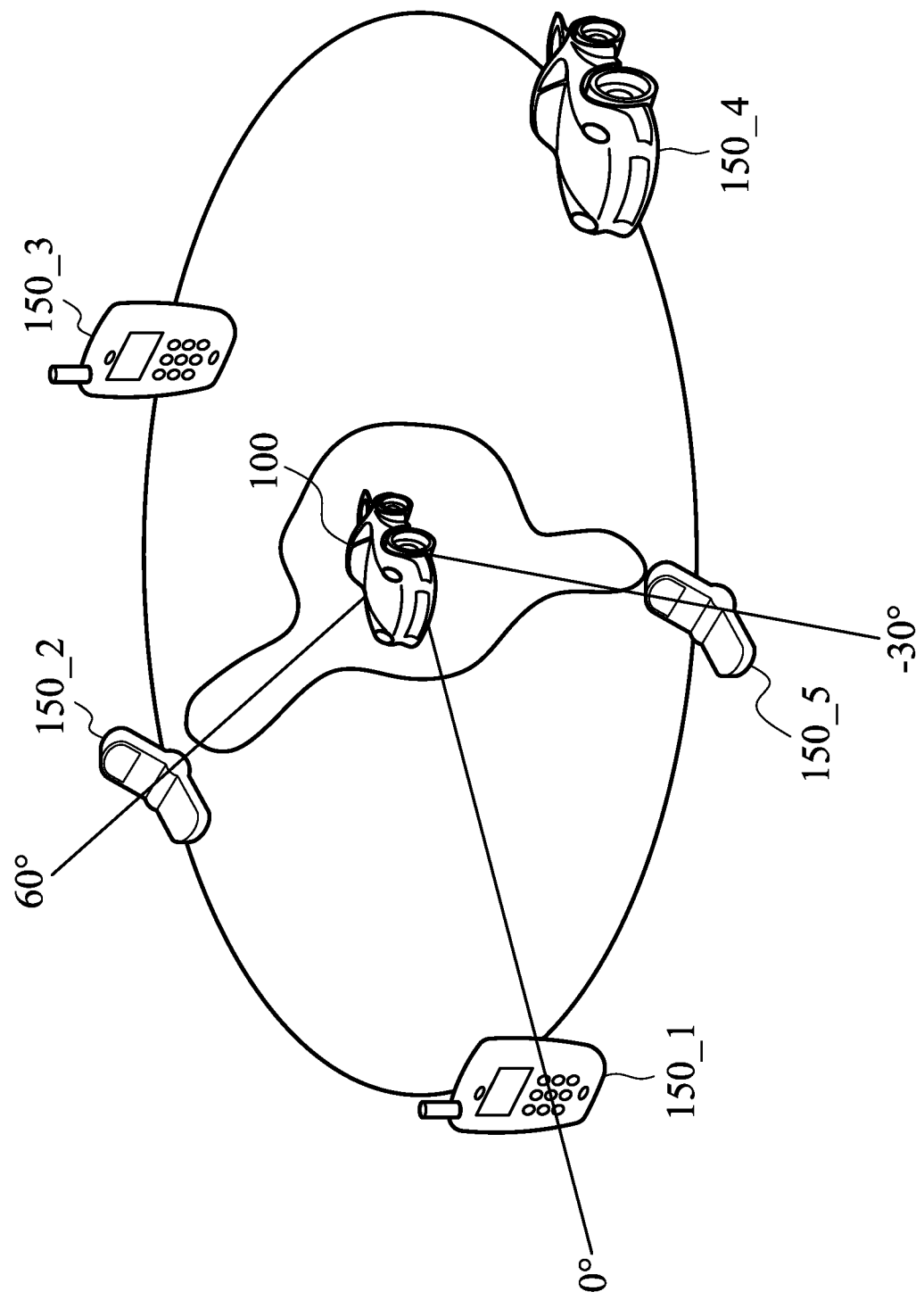
FIG. 2 is a schematic view of an operation between the beamforming transmission device and a plurality of pieces of user equipment according to an embodiment of the present disclosure.

FIG. 2 is a schematic view of an operation between the beamforming transmission device and a plurality of pieces of user equipment according to an embodiment of the present disclosure. In the embodiment, the beamforming transmission device 100 and the pieces of user equipment 150_1~150_5 form a cluster, and the beamforming transmission device 100 is a cluster header of the cluster. Assume that the user equipment 150_2 and the user equipment 150_5 need to communicate with the beamforming transmission device 100. The number of antenna units of the beamforming transmission device 100 is 64, and there are 5 paths. The user equipment 150_2 and the user equipment 150_5 are disposed at 60 degrees and −30 degrees related to the beamforming transmission device 100.

Then, the control unit 110 may calculate gains corresponding to the user equipment 150_2 and the user equipment 150_5 according to the cost function of the channel state information of the user equipment 150_2 and the user equipment 150_5. In the embodiment, the equation (1) and (2) may be derived using the following equations, equation (17) and equation (18).

$$H = [h_1^T h_2^T]^T, \tag{17}$$

$$h_k^T = \sqrt{\frac{64}{5}} \sum_{l=1}^{5} \alpha_l a_t(\theta_l)^H, \tag{18}$$

wherein $h_1^T$ and $h_2^T$ indicate the mmWave channel information of the channel state information of the user equipment 150_2 and the user equipment 150_5. According to the equations (3)~(6) and (15)~(18) or the equations (3) and (7)~(18), the control unit 110 may generate a control signal, so that the beamforming transmission device 100 may generate the corresponding beamforming signal to the user equipment 150_2 and the user equipment 150_5 through the radio frequency unit 120.

Figure 3:
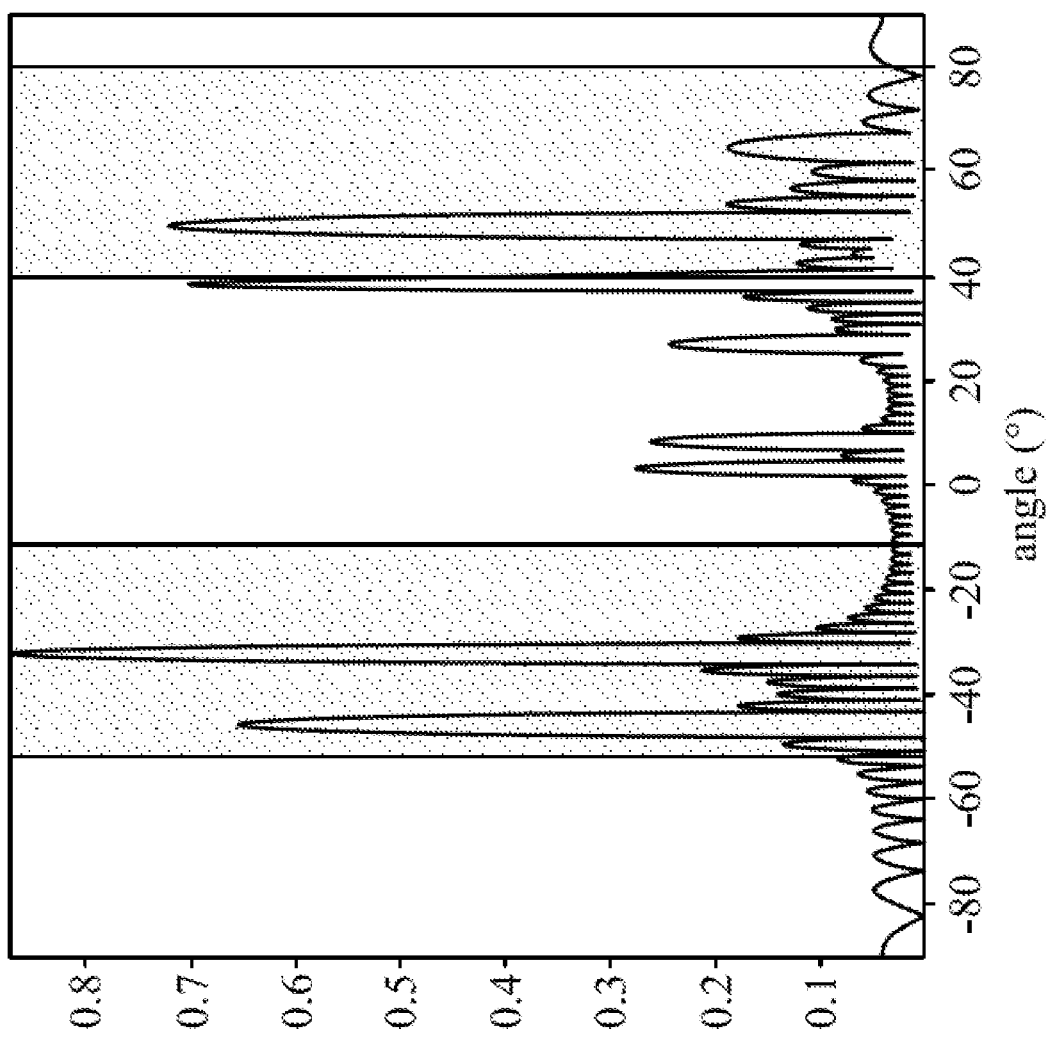
FIG. 3 is a simulation waveform diagram of the beamforming signal according to an embodiment of the represent disclosure.

FIG. 3 is a simulation waveform diagram of the beamforming signal according to an embodiment of the represent disclosure. In FIG. 3, it can be seen that most of the maximum values of the beamforming signal fall within −30 degrees and 60 degrees, corresponding to the user equipment 150_2 and the user equipment 150_5. Accordingly, the beamforming transmission device 100 may use one radio frequency unit 120 to generate the beamforming signal for the plurality of pieces of user equipment (such as the user equipment 150_2 and the user equipment 150_5). Therefore, the switching speed, the design complexity and the power consumption of the beamforming transmission device 100 may be effectively reduced.

In the embodiment of FIG. 1, there is one radio frequency unit 120 and there is one signal transmission unit 130, but the embodiment of the present disclosure is not limited thereto.

Figure 4:
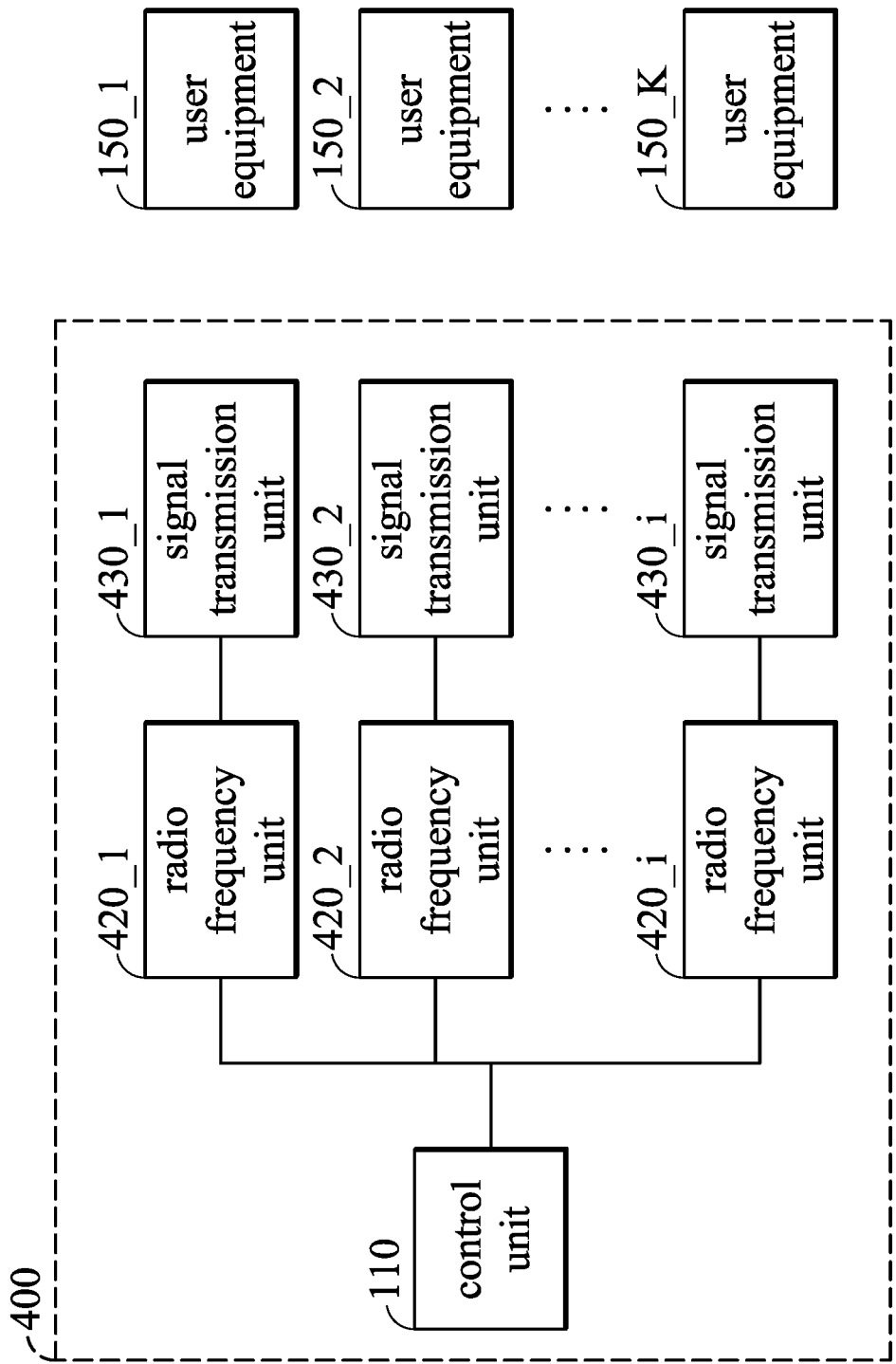
FIG. 4 is a schematic view of a beamforming transmission device according to another embodiment of the present disclosure.

FIG. 4 is a schematic view of a beamforming transmission device according to another embodiment of the present disclosure. Please refer to FIG. 4. The beamforming transmission device 400 includes a control unit 110, a radio frequency unit 420_1~420_i and a signal transmission unit 430_1~430_i, wherein i is a positive greater than 0 (i.e., i≥1). In the embodiment, when the number of the radio frequency unit 420_1~420_i is more than one and the number of the pieces of user equipment 150_1~150_K is more than two, the number of the radio frequency units 420_1~420_i is less than the number of the pieces of user equipment 150_1~150_K, i.e. i<K.

In the embodiment, the control unit 110 is equal to or similar to the control unit 110. Accordingly, the control unit 110 in FIG. 2 may refer to the description of the control unit 110 in FIG. 1, and the description thereof is not repeated herein.

In addition, the radio frequency units 420_1~420_i are equal to or similar to the radio frequency unit 120 in FIG. 1. Accordingly, the radio frequency units 420_1~420_i may refer to the description of the radio frequency unit 120 in FIG. 1, and the description thereof is not repeated herein. The signal transmission units 430_1~430_i and the internal elements thereof are equal to or similar to the signal transmission unit 130 in FIG. 1. Accordingly, the signal transmission units 430_1~430_i may refer to the description of the signal transmission unit 130 in FIG. 1, and the description thereof is not repeated herein. Therefore, the beamforming transmission device 200 may achieve the same effect as the beamforming transmission device 100.

Accordingly, the beamforming transmission device 400 may use lower number of radio frequency units 420_1~420_i to generate the beamforming signals for the pieces of user equipment 150_1~150_K, so as to support the plurality of pieces of user equipment 150_1~150_K. Therefore, the switching speed, design complexity, and power consumption of the beamforming transmission device 400 may be effectively reduced.

Figure 5:
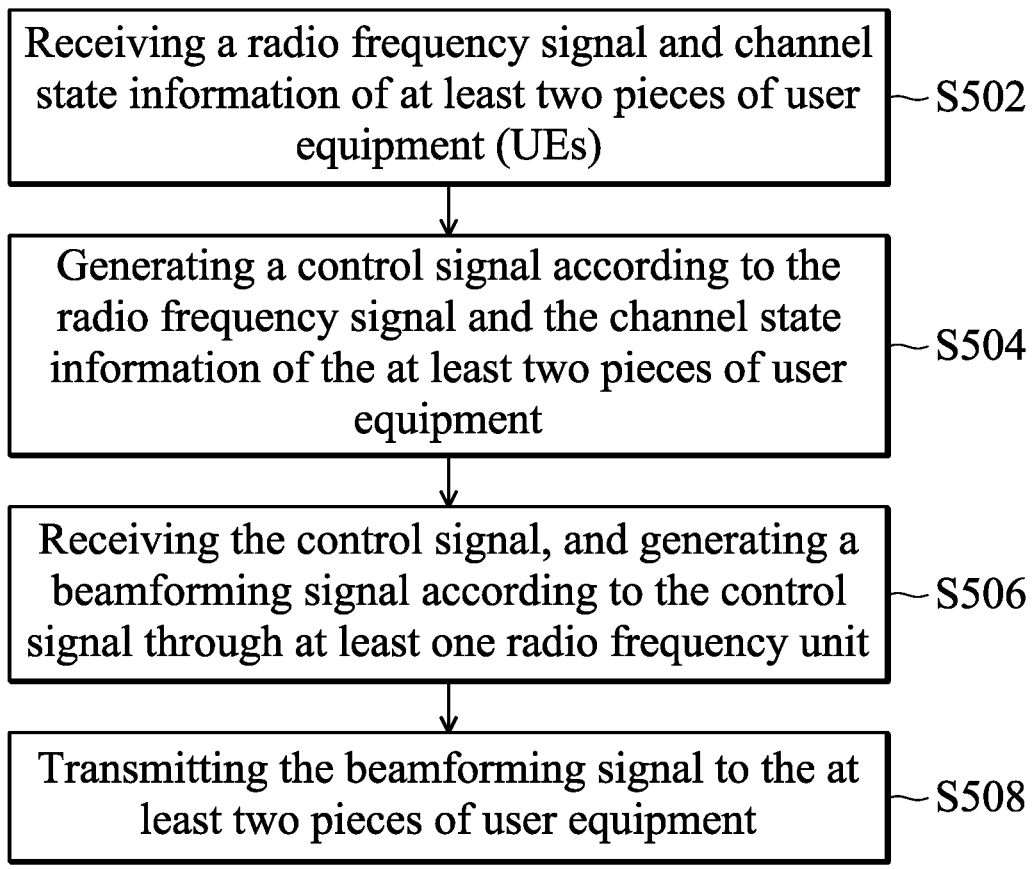
FIG. 5 is a flowchart of a beamforming transmission method according to an embodiment of the present disclosure.

According to the above-mentioned description, the above embodiments may provide a beamforming transmission method. FIG. 5 is a flowchart of a beamforming transmission method according to an embodiment of the present disclosure.

In step S502, the method involves receiving a radio frequency signal and channel state information of at least two pieces of user equipment (UEs). In step S504, the method involves generating a control signal according to the radio frequency signal and the channel state information of the at least two pieces of user equipment.

In step S506, the method involves receiving the control signal, and generating a beamforming signal according to the control signal through at least one radio frequency unit. In step S508, the method involves transmitting the beamforming signal to the at least two pieces of user equipment.

In the embodiment, when the number of the at least one radio frequency unit is more than one and the number of the at least two pieces of user equipment is more than two, the number of radio frequency units is less than the number of pieces of user equipment. The radio frequency unit is a radio frequency (RF) chain. The at least two pieces of user equipment are disposed in different positions.

Figure 6:
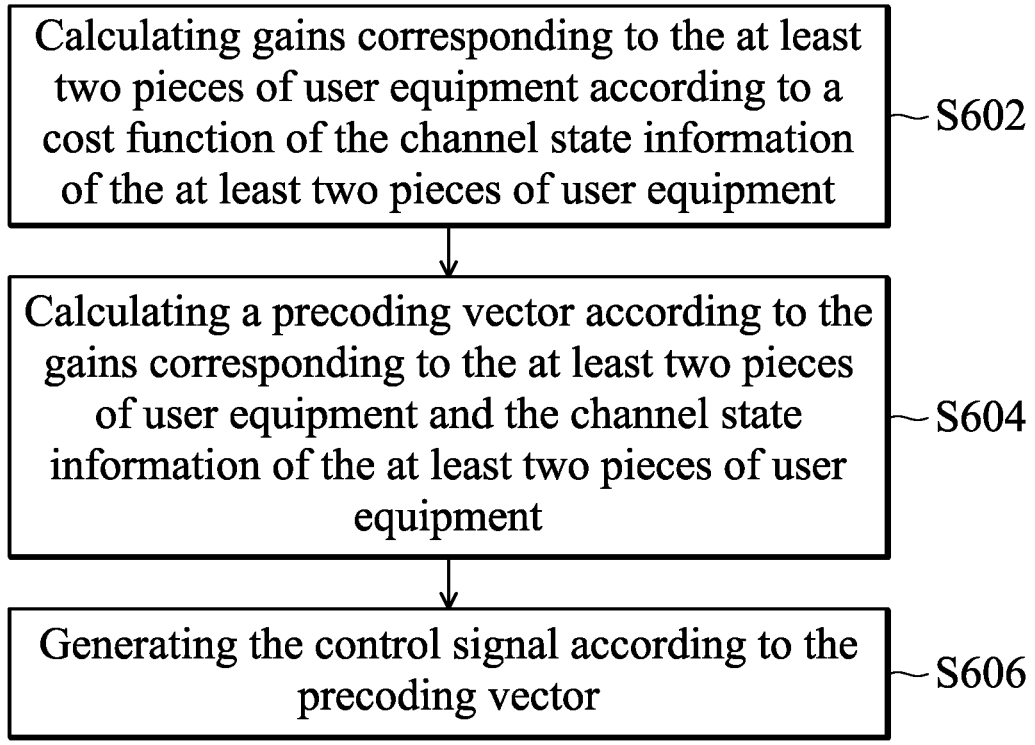
FIG. 6 is a detailed flowchart of step S504 in FIG. 5.

FIG. 6 is a detailed flowchart of step S504 in FIG. 5. In step S602, the method involves calculating gains corresponding to the at least two pieces of user equipment according to a cost function of the channel state information of the at least two pieces of user equipment. In step S604, the method involves calculating a precoding vector according to the gains corresponding to the at least two pieces of user equipment and the channel state information of the at least two pieces of user equipment. In step S606, the method involves generating the control signal according to the precoding vector.

In summary, according to the beamforming transmission device and method of the embodiments of the present disclosure, the control unit receives the radio frequency signal and the channel state information of the at least two pieces of user equipment, and generate a control signal according to the radio frequency signal and the channel state information of the at least two pieces of user equipment. Then, the radio frequency unit generates a beamforming signal according to the control signal and the beamforming signal is transmitted to the at least two pieces of user equipment. Therefore, the embodiment of the present disclosure may use the lower number of radio frequency units to support the plurality of pieces of user equipment, and the switching speed, design complexity, and power consumption of the beamforming transmission device may be effectively reduced.

While the disclosure has been described by way of example and in terms of the embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A beamforming transmission device, comprising:
   a control unit, configured to receive a radio frequency signal and channel state information of at least two pieces of user equipment (UEs), and generate a control signal according to the radio frequency signal and the channel state information of the at least two pieces of user equipment;
   at least one radio frequency unit, coupled to the control unit, and configured to receive the control signal, and generate a beamforming signal according to the control signal; and
   at least one signal transmission unit, coupled to the at least one radio frequency unit, and configured to transmit the beamforming signal to the at least two pieces of user equipment;
   wherein the control unit further calculates gains corresponding to the at least two pieces of user equipment according to a cost function of the channel state information of the at least two pieces of user equipment, calculates a precoding vector according to the gains corresponding to the at least two pieces of user equipment and the channel state information of the at least two pieces of user equipment, and generates the control signal according to the precoding vector,
   wherein the gains corresponding to the at least two pieces of user equipment are derived according to the following equation:

$$Kg_l^2\|q_l\|^2 + \sigma^2 \sum_{k=1}^{K}(\|q_l\|^2 - \|q_k\|^2) = P_T,$$

wherein k indicates the pieces of user equipment, gk (k=1~K) indicates gains corresponding to the k pieces of user equipment, $\sigma$ indicates a standard deviation of the noise, $q_1 \sim q_K = H^H(HH^H)^{-1}$, $q_l$ indicates l-th column of the matrix $H^H(HH^H)^{-1}$, and $P_T$ indicates the total transmit power of the radio frequency signal,
   wherein the precoding vector is expressed by the following equation:

$$f = H^H(HH^H)^{-1}\begin{bmatrix} g_1 \\ g_2 \\ \vdots \\ g_K \end{bmatrix},$$

wherein f indicates a precoding vector and $f \in \mathbb{C}^{N_t \times 1}$, H indicates the mmWave channel information of the channel state information of k pieces of user equipment, $g_1 \sim g_K$ indicate the gains corresponding to the k pieces of user equipment, wherein the control signal is expressed by the following equation:

$$r_k = h_k^T f s + n_k,$$

wherein $r_k$ indicates the control signal, $h_k^T$ (k=1~K) indicates mmWave channel information of the channel state information of kth of pieces of user equipment, s indicates a symbol and $s \in \mathbb{C}^{1 \times 1}$, $n_k$ indicates a received noise.

2. The beamforming transmission device as claimed in claim 1, wherein when the number of the at least one radio frequency unit is more than one and the number of the at least two pieces user equipment is more than two, the number of radio frequency units is less than the number of the pieces of user equipment.

3. The beamforming transmission device as claimed in claim 1, wherein the at least one signal transmission unit comprises:
   a plurality of phase shifters, coupled to the at least one radio frequency unit, and configured to adjust a phase of the beamforming signal;
   a plurality of gain units, coupled to the corresponding phase shifters, and configured to adjust a gain of the beamforming signal; and
   a plurality of antenna units, coupled to the corresponding gain units, and configured to transmit the beamforming signal to the at least two pieces of user equipment.

4. The beamforming transmission device as claimed in claim 1, wherein the cost function comprises the maximization of the minimum of data rates of the at least two pieces of user equipment or the maximization of a sum rate of the at least two pieces of user equipment.

5. The beamforming transmission device as claimed in claim 1, wherein the at least one radio frequency unit is a radio frequency (RF) chain.

6. The beamforming transmission device as claimed in claim 1, wherein the at least two pieces of user equipment are disposed in different positions.

7. A beamforming transmission method, comprising:
   receiving a radio frequency signal and channel state information of at least two pieces of user equipment (UEs);
   generating a control signal according to the radio frequency signal and the channel state information of the at least two pieces of user equipment;
   receiving the control signal, and generating a beamforming signal according to the control signal through at least one radio frequency unit; and
   transmitting the beamforming signal to the at least two pieces of user equipment;
   wherein the step of generating a control signal according to the radio frequency signal and the channel state information of the at least two pieces of user equipment comprises:
   calculating gains corresponding to the at least two pieces of user equipment according to a cost function of the channel state information of the at least two pieces of user equipment;
   calculating a precoding vector according to the gains corresponding to the at least two pieces of user equipment and the channel state information of the at least two pieces of user equipment; and
   generating the control signal according to the precoding vector,
   wherein the gains corresponding to the at least two pieces of user equipment are derived according to the following equation:

$$K g_l^2 \|q_l\|^2 + \sigma^2 \sum_{k=1}^{K} (\|q_l\|^2 - \|q_k\|^2) = P_T,$$

wherein k indicates the pieces of user equipment, gk (k=1~K) indicates gains corresponding to the k pieces of user equipment, $\sigma$ indicates a standard deviation of the noise, $q_1 \sim q_K = H^H(HH^H)^{-1}$, $q_l$ indicates l-th column of the matrix $H^H(HH^H)^{-1}$, and $P_T$ indicates the total transmit power of the radio frequency signal, wherein the precoding vector is expressed by the following equation:

$$f = H^H(HH^H)^{-1} \begin{bmatrix} g_1 \\ g_2 \\ \vdots \\ g_K \end{bmatrix},$$

wherein f indicates a precoding vector and $f \in \mathbb{C}^{N_t \times 1}$, H indicates the mmWave channel information of the channel state information of k pieces of user equipment, $g_1 \sim g_K$ indicate the gains corresponding to the k pieces of user equipment, wherein the control signal is expressed by the following equation:

$$r_k = h_k^T f s + n_k,$$

wherein $r_k$ indicates the control signal, $h_k^T$ (k=1~K) indicates mmWave channel information of the channel state information of kth of pieces of user equipment, s indicates a symbol and $s \in \mathbb{C}^{1 \times 1}$, $n_k$ indicates a received noise.

8. The beamforming transmission method as claimed in claim 7, wherein when the number of the at least one radio frequency unit is more than one and the number of the at least two pieces of user equipment is more than two, the number of radio frequency units is less than the number of the pieces of user equipment.

9. The beamforming transmission method as claimed in claim 7, wherein the cost function comprises the maximization of the minimum of data rates of the at least two pieces of user equipment or the maximization of a sum rate of the at least two pieces of user equipment.

10. The beamforming transmission method as claimed in claim 7, wherein the at least one radio frequency unit is a radio frequency (RF) chain.

11. The beamforming transmission method as claimed in claim 7, wherein the at least two pieces of user equipment are disposed in different positions.

* * * * *